US011269079B2

(12) United States Patent
Fernandez Gomez De Aranda

(10) Patent No.: US 11,269,079 B2
(45) Date of Patent: Mar. 8, 2022

(54) METHOD FOR AUTHENTICATING THE POSITION SUPPLIED BY GNSS SYSTEMS WHICH IS ALSO VALID IN SITUATIONS IN WHICH THE RECEIVER IS STARTING UP COLD

(71) Applicant: Miguel Angel Fernandez Gomez De Aranda, Madrid (ES)

(72) Inventor: Miguel Angel Fernandez Gomez De Aranda, Madrid (ES)

(*) Notice: Subject to any disclaimer, the term of this patent is extended or adjusted under 35 U.S.C. 154(b) by 245 days.

(21) Appl. No.: 16/608,485

(22) PCT Filed: May 5, 2017

(86) PCT No.: PCT/ES2017/070277
§ 371 (c)(1),
(2) Date: Oct. 25, 2019

(87) PCT Pub. No.: WO2018/202924
PCT Pub. Date: Nov. 8, 2018

(65) Prior Publication Data
US 2020/0191974 A1 Jun. 18, 2020

(51) Int. Cl.
*G01S 19/21* (2010.01)
*G01S 19/02* (2010.01)

(52) U.S. Cl.
CPC ............ *G01S 19/215* (2013.01); *G01S 19/02* (2013.01)

(58) Field of Classification Search
CPC .......... G01S 19/00; G01S 19/02; G01S 19/21; G01S 19/215
See application file for complete search history.

(56) References Cited

U.S. PATENT DOCUMENTS 10,261,169 B2* 4/2019 Richley ................. G01S 5/0215
2008/0183384 A1 7/2008 Gaal et al.
(Continued)

FOREIGN PATENT DOCUMENTS

WO 2010019479 A1 2/2010

OTHER PUBLICATIONS

ITU-R Recommendation M.1371-5 "Technical characteristics for an automatic identification system using time division multiple access in the VHF maritime mobile frequency band" Feb. 2014 (Year: 2014).*

(Continued)

*Primary Examiner* — Cassi J Galt
(74) *Attorney, Agent, or Firm* — Lucas & Mercanti, LLP

(57) ABSTRACT

The method indicates a way to avoid or considerably reduce the possibility of a jamming or spoofing attack successfully affecting the signals from the satellites, allowing the satellites to be detected even in situations where the receiver is starting up cold and makes it possible for the GNSS positions that have been verified using same to be accepted as evidence before a court of law. To ensure that the position calculated by the receiver is valid, the method includes a transmitter in the radio navigation receiver, various functions added to the actual satellites and the ground control segment of the GNSS system, in order to be able to calculate the location/area where the receiver is located. With the information, the position supplied by the receiver can be compared with that calculated by a third entity to detect whether it is correct or, conversely, if it cannot be considered valid.

8 Claims, 6 Drawing Sheets

(56) References Cited

U.S. PATENT DOCUMENTS

2009/0253440 A1    10/2009  Edge
2015/0002334 A1     1/2015  Lim et al.
2017/0102466 A1*    4/2017  Petkus ..................... G01S 5/06

OTHER PUBLICATIONS

International Search Report for Corresponding International Application No. PCT/ES2017/070277, (3 Pages) (dated Jan. 23, 2018).
Jozef Petrek, A satellite based localisation service using a 3G mobile phone as an emergency terminal, Jun. 2015.†

* cited by examiner
† cited by third party

METHOD FOR AUTHENTICATING THE POSITION SUPPLIED BY GNSS SYSTEMS WHICH IS ALSO VALID IN SITUATIONS IN WHICH THE RECEIVER IS STARTING UP COLD

CROSS REFERENCE TO RELATED APPLICATION

This Application is a 371 of PCT/ES2017/070277 filed on May 5, 2017, which is incorporated herein by reference.

CROSS REFERENCE TO RELATED APPLICATION

This Application is a 371 of PCT/ES2017/070277 filed on May 5, 2017, which is incorporated herein by reference

FIELD OF THE INVENTION

The present invention comes under the umbrella of GNSS systems (Global Navigation Satellite System) and their manner of including added functions, security and authenticity to the elements provided by systems of this type (time and position of the observer).

The proposed method establishes a way to avoid or considerably reduce the possibility of a jamming or spoofing attack successfully affecting the signals from the satellites, furthermore allowing the satellites to be detected even in situations in which the receiver is starting up cold.

Furthermore, it is also suggested that this method is used for the GNSS positions, which have been verified using same, to be accepted as evidence before a court of law.

To ensure that the position calculated by the receiver is valid, this patent suggests including a transmitter in the radio navigation receiver, in addition to various functions added to the actual satellites and the ground control segment of the GNSS system, in order to be able to calculate, by the ground segment or another authorized entity, the location/area where the receiver is located.

Furthermore, this method for reverse calculation of the position can be used in salvage and rescue environments as a replacement for current SAR (Search and Rescue) location systems since it greatly improves both the precision and the time of obtaining the location, whereby accident/accident victim search times as well as the response time will in turn be improved. Therefore, the proposed method renders current satellite SAR location systems obsolete.

BACKGROUND OF THE INVENTION

There is no doubt as to the importance of GNSS technology in society today. In fact, GNSS systems (mainly GPS at the time of drafting this document) have become a basic part of a considerable number of the technologies used today. This is not only in reference to the use of the GNSS position in navigators of different brands, but also the high precision time provision as a basic part of many other technologies. As merely an example, it could be mentioned that the time provided by GPS today is widely used for synchronizing bank transfers and for synchronizing different production infrastructures, such as energy transport infrastructures, in many countries.

The problem arises when, due to distance between satellites and the surface of the earth, the signal from the satellite reaches the receiver with very little signal strength, which means that it is very sensitive to any jamming-type attack.

Additionally, open signals can be readily copied and redistributed (spoofing attacks) using current very low-cost RF technologies such as SDR (Software Defined Radio) equipment, for example. In fact, current GNSS providers continue to search for new techniques allowing them to authenticate the signals in order to avoid attacks of this type. Today, jamming attacks are very hard (if not impossible) to avoid, although there are different initiatives which primarily seek to provide greater security against attacks of spoofing such as, for example, GPS PPS (P code), GALILEO PRS, etc., all of which are based on the use of encrypting techniques to enable being controlled/used for military/governmental purposes. There are also some proposals focused on the determination/detection of spoofing-type attacks which are based on the determination and comparison of different parameters of the signal as well as the detection of impossible hops in the final position delivered by the receiver. The problem in this case is based on the need to receive all the information about the position and the status (almanac and ephemeris) of the different satellites of the constellation so the receiver is able to calculate the position thereof. This means that if the receiver is starting up cold, i.e., starting up the for first time, it still does not have said information about the satellites such that modified information can be sent to it without the receiver being able to distinguish whether or not it is correct. As of the publication of this patent, this problem still has not been solved.

Moreover, the signals that are most widely used today are precisely open signals, and all signs point to the economic and commercial viability of GNSS systems being based more on signals/services of this type than on those which are encrypted. Another element to be taken into account is that the bandwidth needed to avoid the aforementioned problems, using encryption techniques, is much greater than that available at the time of writing this patent.

From the commercial viewpoint, GPS does not take into account any special technique facilitating it; it simply provides open signals without offering any type of security about the same that may be taken into account.

In GALILEO, however, a Commercial Service (CS) is defined but the commercial model thereof is still unclear, in other words, the proposed the services (authentication and high accuracy) are hard to sell from a strictly commercial viewpoint. In any case, the problem of the receiver starting up cold has still not been solved in the case of using the authentication proposed in the GALILEO Commercial Service.

DESCRIPTION OF THE INVENTION

The present patent application suggests a new method that allows the authentication of the calculated position and time by a GNSS receiver rather than trying to authenticate each of the signals from the satellites used themselves.

The forward calculation of the position is how any receiver today calculates its position using signals from the different satellites of the constellation (see FIG. 1). This way of calculating the position of the GNSS receiver is well known and fully documented, so the specific algorithm is not included herein.

The reverse calculation of the position is the calculation of the position of the receiver by a third entity (not the actual receiver). To do this, the GNSS receiver must transmit a signal to the satellites in order to be able to compute the position thereof.

At this point, the first problem is that the quality and precision of the time provided by the clock of the receiver is not good enough to have a sufficiently accuracy position. Historically, this was because of the cost, size and weight of the receivers when precision clocks were included therein.

Instead of using high precision clocks in the receivers to obtain the distances between them and each of the satellites, the invention suggests using the time of arrival (TOA) of the signal sent by the receiver to each satellite, to have a sufficiently precise time reference. This will allow the accuracy of the calculated position to later be good enough to be used.

In this case, a certain pre-process must be performed so that said times of arrival of the signal to the satellites can be used in the calculation of the position and time of the receiver. The time of arrival of the signal to each satellite is different because the position of each satellite is different, so in order to obtain the time of the sending of the signal (which is unknown beforehand) the differences in the time of arrival of the signal between the different satellites that receive it must be calculated. With this data and the known position of the satellites, the "common time" plus the difference of the times of arrival of the signal in each case must be propagated and the formulas commonly used in the forward calculation applied to determine the position of the receiver (see FIG. 3)

The variable time will be implemented as a group of components which will allow a third entity and/or ground segment to perform the calculation of the position and time of the receiver based on each time of reception, for each satellite, for the same signal.

$$\text{Pseudorange} = c \cdot T_{transmission}$$

$$T_{transmission} = Dt + \Delta t$$

$$Dt = \text{SAT}(t_{arrival}) - \text{MIN}(\text{SAT}(t_{arrival}))$$

where

C is the speed of light.

$T_{transmission}$ is the time it takes the signal to travel the distance between the GNSS receiver and the satellite.

Dt is the difference between the minimum time of arrival of the signal and the actual time of arrival to each of the different satellites that receive it.

$\Delta t$ is the unknown amount of time that has to be added to that of each satellite to have the actual time of sending of the signal by the receiver. This value is the same for all the satellites that received the signal so it could be deduced/propagated by calculating different possible values thereof until the solution makes sense and the error is minimal.

$\text{SAT}(t_{arrival})$ the specific time of arrival of the signal for a specific satellite.

$\text{MIN}(\text{SAT}_x(t_{arrival}))$ is the minimum time of arrival of the signal between the different satellites that have received it.

In the calculation of the time of sending of the signal by the receiver, the movement of the satellites must also be taken into account when propagating $\Delta t$ for the accuracy of the position calculated by the proposed method in this patent to be suitable.

After this adjustment, the same mathematical formulas used in the forward calculation can be applied in the calculation of the position of the receiver adding different time increments ($\Delta t$) and adjusting the position of the satellites accordingly. This is performed by calculating the position of the receiver with different values until finding the one that best fits the solution (see FIG. 4).

The comparison between the two calculated positions (forward calculation of the position vs reverse calculation of the position) and their respective error calculations will allow concluding if the calculated position and time by the actual receiver is correct or if, conversely, the receiver is under a spoofing or jamming attack (see FIG. 5).

DESCRIPTION OF A PREFERRED EMBODIMENT OF THE INVENTION

Figure 1:
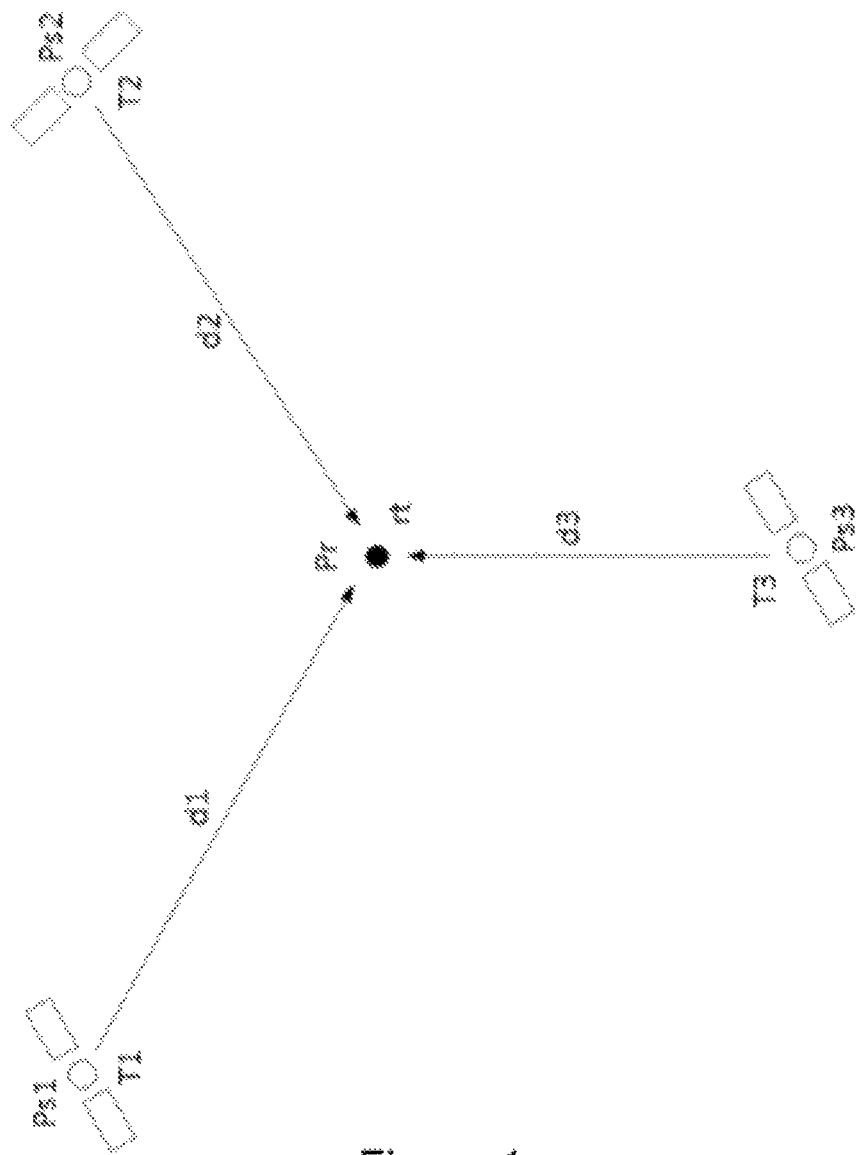
FIG. 1: representation of the triangulation performed by the receiver for calculating its position using forward calculation (it is how position is currently calculated in GNSS systems), where:
  Pr->Position of the Receiver
  Ps1->Position of Satellite 1
  Ps2->Position of Satellite 2
  Ps3->Position of Satellite 3
  rt->Time in the Receiver
  t1->Time in Satellite 1
  t2->Time in Satellite 2
  t3->Time in Satellite 3
  d1->distance from Satellite 1 to the Receiver
  d2->distance from Satellite 2 to the Receiver
  d3->distance from Satellite 3 to the Receiver
Figure 2:
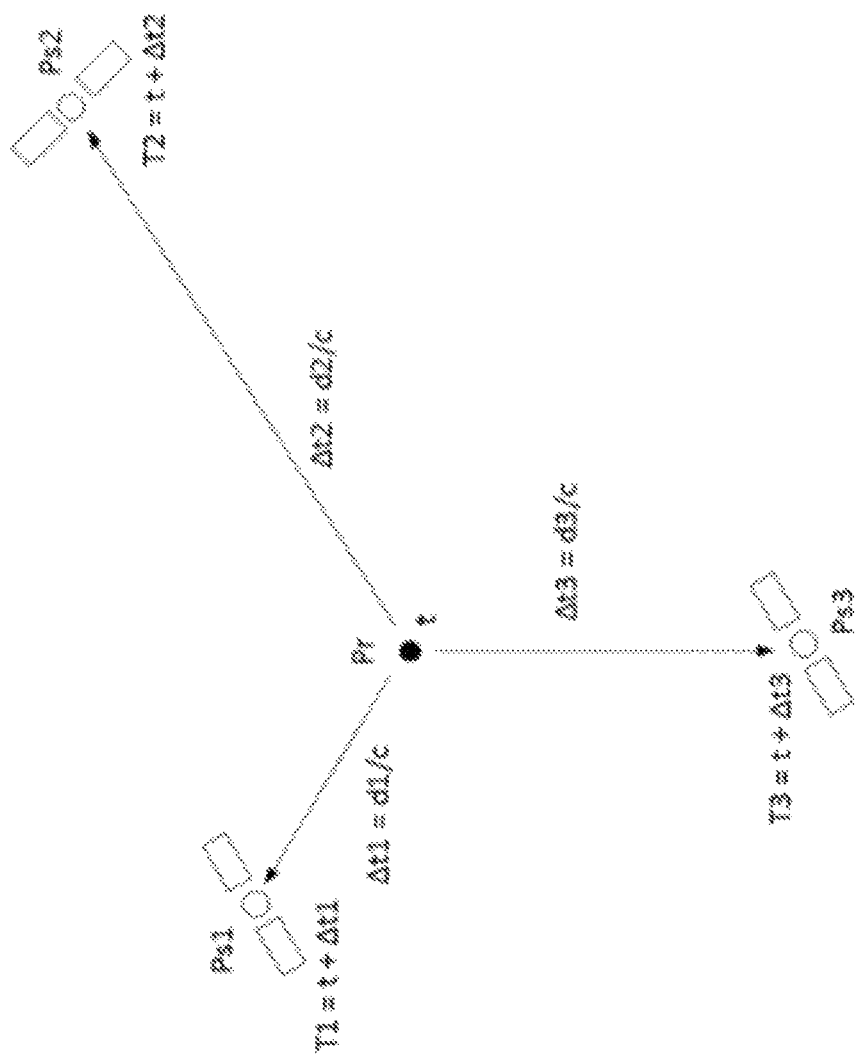
FIG. 2: representation of the mathematical/physical problem solved in this patent, where:
  Pr->Position of the Receiver
  t->time of sending of the signal by the receiver (unknown parameter)
  $\Delta t1$->time it takes the signal emitted by the receiver to reach Satellite 1 (unknown parameter)
  $\Delta t2$->time it takes the signal emitted by the receiver to reach Satellite 2 (unknown parameter)
  $\Delta t3$->time it takes the signal emitted by the receiver to reach Satellite 3 (unknown parameter)
  $\Delta t1 \neq \Delta t2 \neq \Delta t3$
  T1->Time in Satellite 1
  T2->Time in Satellite 2
  T3->Time in Satellite 3
  d1->distance from Satellite 1 to the Receiver (unknown parameter)
  d2->distance from Satellite 2 to the Receiver (unknown parameter)
  d3->distance from Satellite 3 to the Receiver (unknown parameter)
  $d1 \neq d2 \neq d3$
Figure 3:
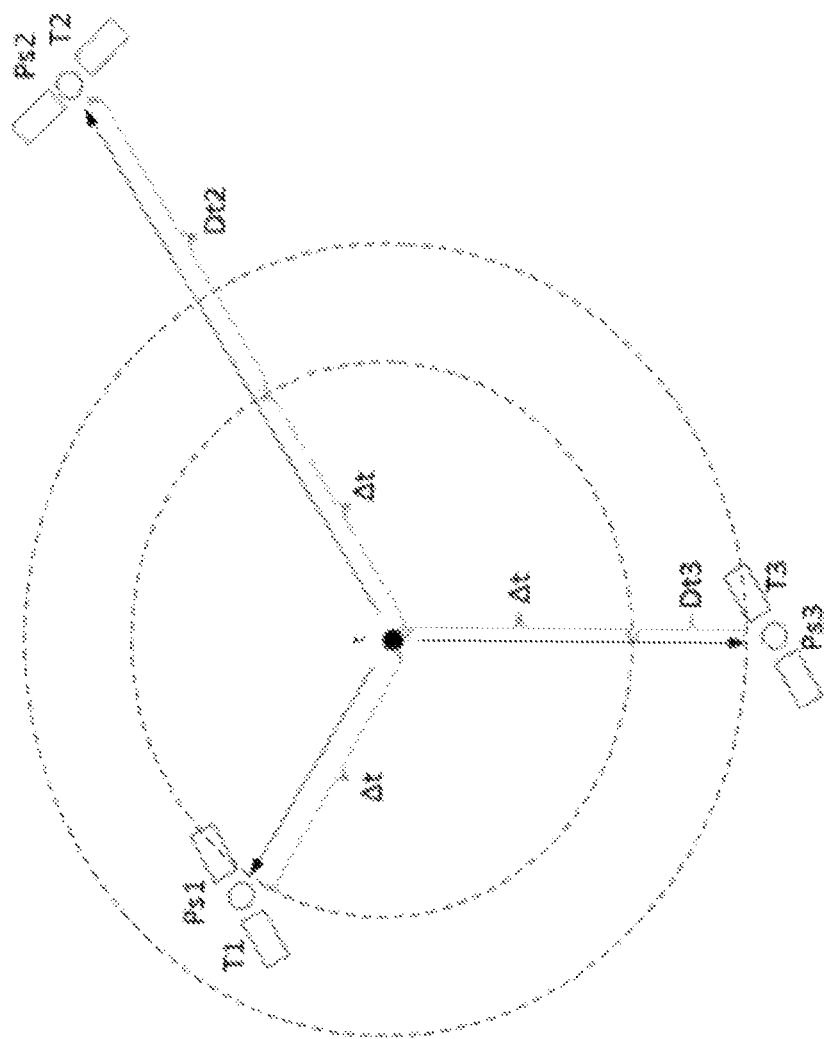
FIG. 3: representation of the mathematics behind the method which is presented in this patent where:
  t->time of sending of the signal by the receiver
  $\Delta t$->time to be added to all the Dtx to complete the time of arrival of the signal to each satellite.
  Ps1->Position of Satellite 1
  Ps2->Position of Satellite 2
  Ps3->Position of Satellite 3
  T1->Time in Satellite 1
  T2->Time in Satellite 2
  T3->Time in Satellite 3
  Unknown parameters are t and $\Delta t$
  Known parameters are Dt2 and Dt3
  Calculated parameters are T1=$\Delta t$, T2=$\Delta t$+Dt2, T3=$\Delta t$+Dt3
Figure 4:
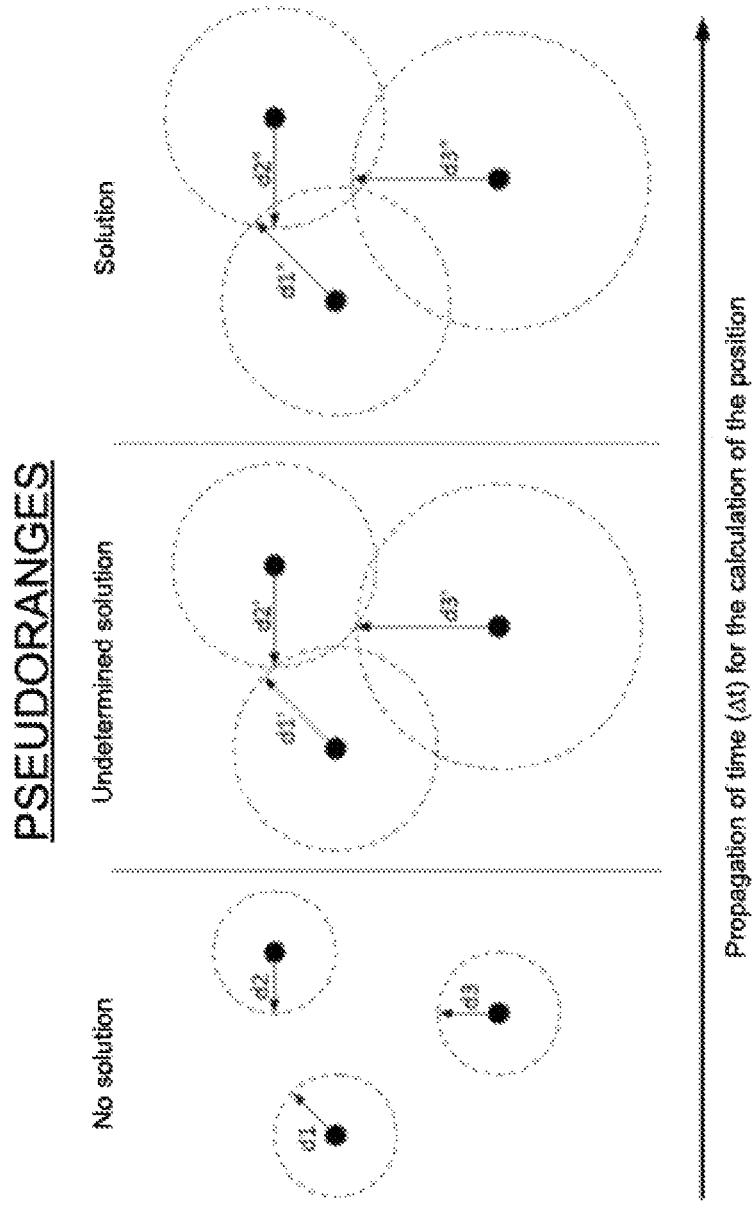
FIG. 4: geometric representation of the expected solutions in the calculation of the time propagation needed to obtain the position and time of the receiver using reverse calculation, where:
  As the value of $\Delta t$ increases, the different types of solutions depicted from left to right will be possible.
Figure 5:
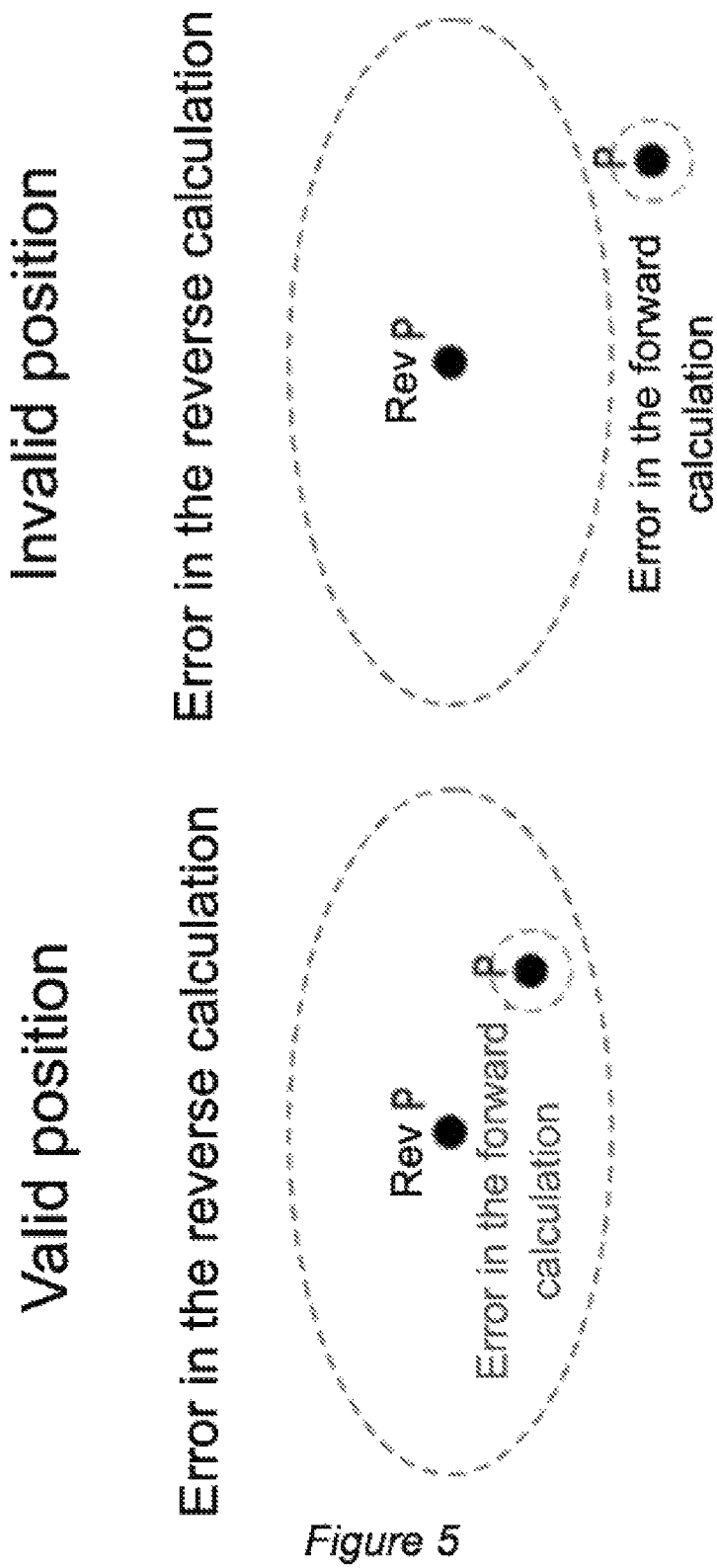
FIG. 5: geometric representation of what can be considered a valid or invalid position upon comparing the results of the forward and reverse calculation of the position of the receiver.
Figure 6:
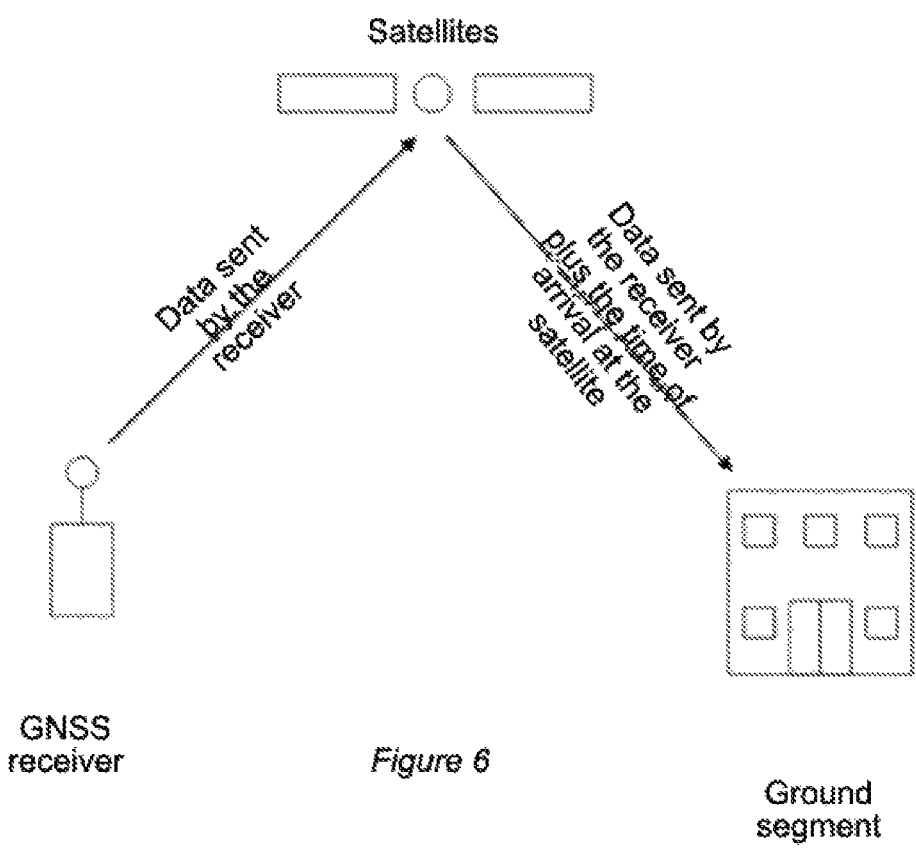
FIG. 6: basic diagram of communications (excluding normal communications of GNSS systems) between the receiver and the ground segment or third entity, needed to be able to provide authentication of the position of the receiver.

In order to use this model, it is necessary to add certain capabilities to GNSS systems:
  Receivers: the capacity to send information to GNSS satellites must be added.
  GNSS satellites: the capacity to acquire the information sent by the receivers as well as being able to determine the time of arrival thereof to the satellite must be added; the information sent by the receiver must be added and sent back to earth again.
  GNSS ground segment: a third entity that is able to calculate the position of the receiver from the data sent by the satellites mentioned in the preceding point must be established.

The sequence for the validation of the position and the time of the receiver will be as follows (see Figure F):
1. The receiver will send a datagram with its ID (identifier), a sequence number and the calculated position and time of the receiver if this information is available. In the case in which the receiver is starting up cold, only information about its identifier will be available. This datagram may be digitally signed by the receiver in order to ensure its authenticity.
2. Each satellite will acquire the signal/datagram sent by the receiver in step 1 and calculate the time of arrival thereof. This will be performed for each datagram individually.
3. Each satellite will send to earth its own identifier together with the information/datagram sent by the receiver (including information about the time of arrival thereof) of steps 1 and 2. This new datagram may be digitally signed by the satellite in order to ensure its authenticity.
4. A third entity/ground segment will receive the information mentioned in step 3 and, depending on the situation:
a. The information will be used to calculate the position and time of the receiver using the proposed method for reverse calculation. The result of whether or not the position and time are validated will be distributed to the user by means of any existing communication method.
b. Raw (unprocessed) information will be passed to the corresponding user/receiver by means of any existing communication method, so that the latter may perform the corresponding processing (method for reverse calculation of the position) to determine whether or not its position is valid.

Where the main data is:
Time:=Date and Time;
Position:=Length+Latitude+Altitude;
Time_of the_receiver:=none|Time;
Position_of_the_receiver:=none|Position;
Sequence number=1 . . . 65536;
SEND_receiver:=Identifier_receiver+Time_of the_receiver+Position_of the_receiver+Sequence_number+Digital_Signature_receiver;
SEND satellite:=Identifier_satellite+Time_arrival_SEND_receiver+SEND_receiver+Digital_Signature_satellite;

Besides the aforementioned data fields, certain structure data fields are necessary (start/end of message, CRC, . . . ) to enable the sending thereof and avoid transmission problems.

The coding of the data fields, Date, Time, Length, Latitude and Altitude must be designed using the smallest possible number of bits in order to maximize the available bandwidth capacity. As an example, a possible coding could be as follows, although many others would also be valid.

Coding the data sent by the receiver to the satellite (total of 159 bits):
  Start of the message (18 bits)
  Identifier of the receiver (32 bits): 1 . . . 4294967297
  Counter (16 bits): 1 . . . 65536
  Latitude (8 bits): −90 . . . +90 degrees coded in Complement A2
  Length (9 bits): −180 . . . +180 degrees coded in Complement A2
  Altitude (26 bits): −100 . . . +67108763 meters coded in Complement A2
  Day (5 bits): 1 . . . 31 days
  Month (4 bits): 1 . . . 12 months
  Year (8 bits): 2016 . . . 2272
  Time (5 bits): 0 . . . 23 hours
  Minute (6 bits): 0 . . . 59 minutes
  Second (6 bits): 0 . . . 59 seconds
  End of the message (16 bits): CRC of the message Coding of the data sent by the satellite to the ground segment/third entity (total of 249 bits):
  Start of the message (18 bits)
  Identifier of the satellite (6 bits): 1 . . . 64
  Counter (16 bits): 1 . . . 65536
  Data sent by the receiver (159 bits)
  Time of arrival Day (5 bits): 1 . . . 31 days
  Time of arrival Month (4 bits): 1 . . . 12 months
  Time of arrival Year (8 bits): 2016 . . . 2272
  Time of arrival Hour (5 bits): 0 . . . 23 hours
  Time of arrival Minute (6 bits): 0 . . . 59 minutes
  Time of arrival Second (6 bits): 0 . . . 59 seconds
  End of message (16 bits): CRC of the message In embodiment 1, a method for estimating a position of a receiver by means of a GNSS system comprising a constellation of satellites, is characterized by comprising a reverse calculation of the position of the receiver according to the following steps:
  transmitting a signal from the receiver to the satellites,
  recording the time of arrival of the signal from the receiver to each of the satellites, and retransmitting said signal with its time of arrival record from each satellite to a third entity, said signal including an identification of each satellite,
  estimating a common time, equivalent to the time it takes the signal to travel from the receiver to the nearest satellite,
  estimating a distance from the receiver to each satellite depending on the common time, on the times of arrival of the signal from the receiver to each of the satellites, and on a propagation speed of the signal, and
  obtaining the position of the receiver from the estimated distance from the receiver to each of the satellites,
wherein estimating the common time comprises the following sub-steps:
  recording the time of arrival of the signal from the receiver to each of the satellites, calculating the differences in the time of arrival of the signal between the different satellites that receive it, calculating the common time by means of a sub-step of mathematical propagation, and wherein the sub-step of mathematical propagation for obtaining the common time comprises:

performing a sequential estimation of the position of the receiver with different pseudorange values estimated according to an incremental variation of the common time from at least three active satellites in the following ratios:

Pseudorange=c*Ttransmission

Ttransmission=Dt+Δt, where c is the speed of light and Δt is the common time, and until finding a first position that geometrically matches, and determining, depending on the pseudorange from said first position that geometrically matches to the nearest satellite and on the propagation speed of the signal, the time it takes the signal sent by the receiver to reach the nearest satellite, the result of which will be the common time.

Embodiment 2 provides the method according to embodiment 1, wherein for starting up cold the signal sent from the receiver to each of the satellites includes only an identifier of the receiver and a sequence number.

Embodiment 3 provides the method according to embodiment 1, wherein in continuous operation the signal sent from the receiver to each of the satellites includes an identifier of the receiver, a sequence number, and a forward-calculated position and time of the receiver, the method further comprising a step of carrying out an authentication of the forward-calculated position of the receiver by comparison between said forward-calculated position and the reverse-calculated position to check whether they match.

Embodiment 4 provides the method according to embodiment 3, wherein the reverse calculation of the position of the receiver and the authentication of the forward-calculated position of the receiver by comparison between said forward-calculated position and the reverse-calculated position are performed by the third entity.

Embodiment 5 provides the method according to embodiment 4, further comprising a step of sending the result of the authentication from the third entity to the receiver.

Embodiment 6 provides the method according to any of embodiments 1 to 3, further comprising a step of transmitting the time of arrival of the signal from the receiver to each of the satellites from the third entity to the receiver so that said receiver can perform the reverse calculation Embodiment 7 provides The method according to claim 6, wherein the authentication of the forward-calculated position by comparison between said forward-calculated position and the reverse-calculated position is performed by the receiver.

Embodiment 8 provides a system for estimating a position of a receiver by means of a GNSS system comprising a plurality of satellites, characterized by comprising:

a first signal emitter arranged in the receiver for sending a signal to the satellites, first additional receivers arranged in the satellites for receiving the signal forwarded by the first emitter of the receiver, second emitters arranged in the satellites for retransmitting the signal and the time of arrival of the signal from the receiver to each of the satellites for the reverse calculation of the position of the receiver, and a third calculation entity provided with at least a second additional receiver for receiving the signal and the time of arrival of the signal from the receiver to each of the satellites emitted by the second emitter and performing the reverse calculation of said position of the receiver from the time of arrival of the signal from the receiver to each of the satellites or retransmitting the time of arrival of the signal from the receiver to each of the satellites so that the receiver can perform the reverse calculation.

The invention claimed is:

1. A method for estimating a position of a receiver by means of a GNSS system comprising a constellation of satellites, comprising a reverse calculation of the position of the receiver according to the following steps:

transmitting a signal from the receiver to the satellites, recording the time of arrival of the signal from the receiver to each of the satellites, and retransmitting said signal with its time of arrival record from each satellite to a third entity, said signal including an identification of each satellite, estimating a common time, equivalent to the time it takes the signal to travel from the receiver to the nearest satellite, estimating a distance from the receiver to each satellite depending on the common time, on the times of arrival of the signal from the receiver to each of the satellites, and on a propagation speed of the signal, and obtaining the position of the receiver from the estimated distance from the receiver to each of the satellites, wherein estimating the common time comprises the following sub-steps:

recording the time of arrival of the signal from the receiver to each of the satellites, calculating the differences in the time of arrival of the signal between the different satellites that receive it, calculating the common time by means of a sub-step of mathematical propagation, and wherein the sub-step of mathematical propagation for obtaining the common time comprises:

performing a sequential estimation of the position of the receiver with different pseudorange values estimated according to an incremental variation of the common time from at least three active satellites in the following ratios:

Pseudorange=$c$*Ttransmission

Ttransmission=$Dt+\Delta t$, wherein c is the speed of light and Δt is the common time, and until finding a first position that geometrically matches, and determining, depending on the pseudorange from said first position that geometrically matches to the nearest satellite and on the propagation speed of the signal, the time it takes the signal sent by the receiver to reach the nearest satellite, the result of which will be the common time.

2. The method according to claim 1, wherein for starting up cold the signal sent from the receiver to each of the satellites includes only an identifier of the receiver and a sequence number.

3. The method according to claim 1, wherein in the continuous operation the signal sent from the receiver to each of the satellites includes an identifier of the receiver, a sequence number, and a forward-calculated position and time of the receiver, and wherein the method further comprises a step of carrying out an authentication of the forward-calculated position of the receiver by a comparison between the forward-calculated position and the position reverse-calculated position to check whether they match.

4. The method according to claim 3, wherein the reverse calculation of the position of the receiver and the authentication of the forward-calculated position of the receiver by comparison between the forward-calculated position and the reverse-calculated position are performed by the third entity.

5. The method according to claim 4, further comprising a step of sending the result of the authentication from the third entity to the receiver.

6. The method according to claim 1, further comprising a step of transmitting the time of arrival of the signal from the receiver to each of the satellites from the third entity to the receiver so that said receiver can perform the reverse calculation.

7. The method according to claim 6, wherein the authentication of the forward-calculated position by comparison between the forward-calculated position and the reverse-calculated position is performed by the receiver.

8. A system for estimating a position of a receiver by means of a GNSS system comprising a plurality of satellites comprising:

a first signal emitter arranged in the receiver for sending a signal to the satellites, first additional receivers arranged in the satellites for receiving the signal forwarded by the first emitter of the receiver, second emitters arranged in the satellites for retransmitting the signal and the time of arrival of the signal from the receiver to each of the satellites for the reverse calculation of the position of the receiver, and a third calculation entity provided with at least a second additional receiver for receiving the signal and the time of arrival of the signal from the receiver to each of the satellites emitted by the second emitter and performing the reverse calculation of said position of the receiver from the time of arrival of the signal from the receiver to each of the satellites or retransmitting the time of arrival of the signal from the receiver to each of the satellites so that the receiver can perform the reverse calculation, wherein the reverse calculation is performed according to the method of claim 1.

* * * * *